Figure 1:
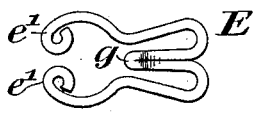

(No Model.)

W. J. EDWARDS & F. R. BARCLAY.
HOOK AND EYE.

No. 482,867. Patented Sept. 20, 1892.

WITNESSES:
J. D. Caplinger
W. S. Boyd.

INVENTORS
William J. Edwards,
Francis R. Barclay.
By L. D. Woodworth,
their ATTORNEY.

UNITED STATES PATENT OFFICE.

WILLIAM J. EDWARDS AND FRANCIS R. BARCLAY, OF YOUNGSTOWN, OHIO.

HOOK AND EYE.

SPECIFICATION forming part of Letters Patent No. 482,867, dated September 20, 1892.

Application filed March 18, 1892. Serial No. 425,497. (No model.)

*To all whom it may concern:*

Be it known that we, WILLIAM J. EDWARDS and FRANCIS R. BARCLAY, citizens of the United States, residing at Youngstown, in the county of Mahoning and State of Ohio, have invented certain new and useful Improvements in Hooks and Eyes; and we do hereby declare the following to be a full, clear, and exact description of our invention, such as will enable others skilled in the art to which it pertains to make and use the same, reference being had to the accompanying drawings, which form part of this specification.

Our invention relates to that class of hooks and eyes used in fastening garments and for similar purposes that are provided with a means for retaining the hook within the eye, so that it may not accidentally become detached therefrom; and its object is a hook and eye of such new form of construction and new retaining device of simple and effective mechanism as to constitute a valuable improvement in hooks and eyes in the matters of cheapness of manufacture, strength, durability, security of lock, and facility of control. We accomplish this object by the device hereinafter described, and illustrated in the drawings, in which—

Figure 2:
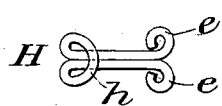
Figure 3:
Figure 4:
Figure 5:
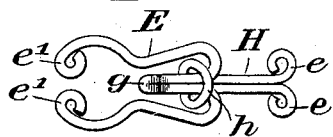

Figure 1 is a plan view of the eye E. Fig. 2 is a similar view of the hook H. Fig. 3 is an edge view of the eye E, showing the depressed end of the hook-guide $g$. Fig. 4 is a similar view of the hook H, showing the upward and rearward turn of the hook proper $h$; and Fig. 5 is a plan view of the eye E and the hook H in co-operating positions, as when a fastening is formed thereby.

The eye E and the hook H are made of any suitable spring metal, in form round or flat, as may be preferred for the use to which they may be applied, and of a length determined by the size of the hook and eye required. For facility of description the ends at which the eyelets appear for sewing the parts to the fabric on which the hook and eye are used will be termed the "rear end."

The hook H is formed by bending the piece of metal abruptly at its longitudinal center, so as to bring the separated ends into contact in their entire length, terminating at the rear end in the outwardly-curved circles, forming the eyelets $e$ $e$, while at the opposite or forward end the hook proper $h$ is formed by suitably bending the end over and backward, and in the thus bent position separating the two parts elsewhere in contact, exhibiting a space between them suitable for the passage of the hook-guide $g$ therethrough. This opening in the hook $h$ for the passage of the hook-guide $g$ is the part that is new in the hook H. To form the eye E, the metal is abruptly bent at its longitudinal center, bringing the separated ends into contact for a suitable distance to form the hook-guide $g$, which is depressed at its end. Thence the parts separate and the two similar sides of the hook H are formed by curving them right and left to a half-circle, from which they extend with an inward inclination along the sides of the hook-guide $g$, with a suitable intervening space to a point opposite its depressed end, and thence by outward followed by inward curvatures to terminations in the eyelets $e'$ $e'$, which are formed by either inward or outward curvatures of the ends, as may be chosen.

The depression of the end of the hook-guide $g$ may be omitted, if desired, without much disadvantage, as will presently appear.

The hook H and the eye E co-operate to interlock and to retain the hook H in such interlock capable of being readily freed, as follows: The hook H is put in place with the hook proper $h$ within the open space of the eye E rearward of the hook-guide $g$, the end of which enters the opening in the hook proper $h$, through which it passes, as the hook H and eye E are drawn apart, permitted by the outward spring of the sides of the eye E, which when the hook proper $h$ reaches the greater space at the foot of the hook-guide $g$ spring back to their first positions, effectually securing the interlocks between the parts, the depressed end of the hook-guide $g$ and the two narrow spaces appearing between the hook-guide $g$ and the sides of the eye E, each interposing obstacles to the escape of the hook H from the eye E.

To disconnect the hook H from the eye E, the two parts are pressed together, the hook $h$ being held with reference to its passage over the depressed end of the guide $g$ until by the same spring action, as before, of the sides of the eye E the hook H is freed therefrom. It will be observed that in hooking the hook H into the eye E either side of the latter may be used, although it is preferable that the depressed end of the hook-guide g and the hook h, both of which are slightly protuberant, should appear outwardly.

We are aware that hooks and eyes have been made with various devices for retaining the hook; but we are not aware that the hook H, provided with the opened hook proper h, or that the eye E, having the hook-guide g and so formed that its sides supply a locking-spring, both as described, were ever known prior to our invention.

What we claim is—

1. In a hook and eye, the combination of a substantially U-shaped eye the free ends of which are provided with means for securing it to a garment and the sides and walls thereof are contracted or bent inward toward each other intermediate their ends and bottom and the bottom or curved portion is provided with a tongue and a hook the point of which is provided with an opening through which the tongue, of the eye passes when the two are engaged, the distance between the contracted portion of the walls of the eye being less than the transverse diameter of the extended or open portion of the hook, whereby the walls of the eye must be sprung outwardly to permit of the passage of the hook between them, substantially as set forth.

2. In a hook and eye, the combination, with a hook the point of which is bent outwardly and rearwardly and is expanded or provided with an opening, of a substantially U-shaped eye the walls of which are contracted or bent inward or toward each other and the bottom or curved portion is provided with a tongue the end of which extends to the contracted portion and is bent downward below the plane of the eye, whereby the end of the tongue will occupy the plane of the hook when in position and must be raised above said plane when it passes through the opening of the hook, substantially as set forth.

In testimony whereof we hereunto affix our signatures in the presence of two witnesses.

WILLIAM J. EDWARDS.
FRANCIS R. BARCLAY.

Witnesses:
GEO. E. ROSE,
LON BLACKBURN.